United States Patent
Desbois et al.

(10) Patent No.: US 6,825,271 B2
(45) Date of Patent: Nov. 30, 2004

(54) ANIONICALLY POLYMERIZED, IMPACT-RESISTANT POLYSTYRENE WITH CAPSULE PARTICLE MORPHOLOGY

(75) Inventors: Philippe Desbois, Maikammer (DE); Christian Schade, Ludwigshafen (DE); Hermann Gausepohl, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 74 days.

(21) Appl. No.: 10/275,561

(22) PCT Filed: May 3, 2001

(86) PCT No.: PCT/EP01/04960

§ 371 (c)(1),
(2), (4) Date: Nov. 7, 2002

(87) PCT Pub. No.: WO01/85816

PCT Pub. Date: Nov. 15, 2001

(65) Prior Publication Data

US 2003/0139531 A1 Jul. 24, 2003

(30) Foreign Application Priority Data

May 10, 2000 (DE) ......................... 100 22 504

(51) Int. Cl.[7] ............................. C08F 279/02; C08F 4/52
(52) U.S. Cl. ............................. 525/70; 525/71; 525/86; 525/89; 525/316; 526/124.2; 526/125.1
(58) Field of Search ............................. 525/71, 86, 89, 525/316, 70; 526/124.2, 125.1

(56) References Cited

U.S. PATENT DOCUMENTS

| | | | |
|---|---|---|---|
| 4,493,922 A | 1/1985 | Echte et al. | |
| 5,153,647 A | 10/1992 | Barker et al. | |
| 5,294,656 A * | 3/1994 | Okamoto et al. | ........... 524/269 |
| 5,334,658 A | 8/1994 | Blumenstein et al. | |
| 5,428,106 A | 6/1995 | Schrader et al. | |
| 5,491,195 A | 2/1996 | Schrader et al. | |
| 5,700,876 A | 12/1997 | Knoll et al. | |
| 5,990,236 A | 11/1999 | Knoll et al. | |
| 6,444,762 B1 * | 9/2002 | Fischer et al. | ................. 526/64 |

FOREIGN PATENT DOCUMENTS

| | | |
|---|---|---|
| DE | 42 09 031 | 9/1993 |
| WO | 95/06686 | 3/1995 |
| WO | 96/18666 | 6/1996 |
| WO | 96/18682 | 6/1996 |
| WO | 97/05197 | 2/1997 |
| WO | 98/07766 | 2/1998 |
| WO | 98/52985 | 11/1998 |
| WO | 99/23157 | 5/1999 |
| WO | 99/40135 | 8/1999 |

* cited by examiner

*Primary Examiner*—James J. Seidleck
*Assistant Examiner*—Olga Asinovsky
(74) *Attorney, Agent, or Firm*—Keil Weinkauf

(57) ABSTRACT

The invention relates to an anionically polymerised, impact-resistant polystyrene with a dispersed plasticiser phase, comprising particles with capsule particle morphology and method for production thereof.

16 Claims, No Drawings

ANIONICALLY POLYMERIZED, IMPACT-RESISTANT POLYSTYRENE WITH CAPSULE PARTICLE MORPHOLOGY

The invention relates to an anionically polymerized, impact-modified polystyrene with a disperse soft phase which comprises particles having capsule particle morphology, and also to a process for its preparation.

Various continuous or batch processes, in solution or suspension, are known for producing impact-modified polystyrene, as described in Ullmanns Enzyklopädie, Vol. A21, VCH Verlagsgesellschaft Weinheim 1992, pp. 615–625. These processes dissolve a rubber, usually polybutadiene, in monomeric styrene, and polymerize the styrene by a free radical mechanism via thermal or peroxidic initiation. Alongside the homopolymerization of styrene, graft polymerization of styrene on polybutadiene also takes place. The simultaneous processes of polystyrene formation and consumption of monomeric styrene cause "phase inversion". The properties of the impact-modified polystyrene are determined by the morphology, size and size distribution of the disperse rubber particles. These depend on various process parameters, such as the viscosity of the rubber solution and the shear forces arising during stirring.

The process parameters known from free-radical preparation of impact-modified polystyrene cannot be directly transferred to the anionic polymerization of styrene in the presence of rubbers, since the reaction mechanisms for free-radical and anionic polymerization of styrene are different. For example, it is not possible to use homopolybutadiene alone, since no graft reactions occur during anionic polymerization of styrene.

DE-A 42 35 978, DE-A-42 35 978, WO 96/18666, WO 96/18682, WO 99/40135 or U.S. Pat. No. 4,153,647, for example, disclose a process for preparing thermoplastic molding compositions by anionically polymerizing styrene in the presence of styrene-butadiene block copolymers. The resultant impact-modified products have lower residual monomer contents and lower oligomer contents than do products obtained by free-radical polymerization. The disperse soft phase generally develops cellular particle morphology.

WO 98/07766 describes the continuous preparation of impact-modified molding compositions using styrene-butadiene rubbers. The rubbers were polymerized anionically using alkyl compounds of alkaline earth metals, of zinc and of aluminum, in styrene as solvent. However, their butadiene blocks always contain small amounts of copolymerized styrene.

WO 99/67308 describes anionically polymerized impact-modified polystyrene with high stiffness and toughness and with cellular particle morphology.

It is an object of the present invention to provide an anionically polymerized, impact-modified polystyrene with high gloss, and also a process for its preparation.

We have found that this object is achieved by means of an anionically polymerized, impact-modified polystyrene which comprises a disperse soft phase with particles having capsule particle morphology.

It is preferable for at least 90 percent by volume, in particular at least 95 percent by volume, of the soft phase to be composed of particles with capsule particle morphology.

The impact-modified polystyrene of the invention may be obtained by anionically polymerizing styrene in the presence of a styrene-butadiene two-block copolymer and of an anionic polymerization initiator, the styrene-butadiene two-block copolymer having a styrene block content of from 40 to 60% by weight, preferably from 45 to 55% by weight.

For this purpose it is particularly preferable to use styrene-butadiene two-block copolymers whose styrene block S has a weight-average molar mass $M_w$ of from 20,000 to 200,000 g/mol and whose butadiene block B has a weight-average molar mass $M_w$ of from 30,000 to 300,000 g/mol. The transitions between the blocks S and B may be either sharp or blurred.

The anionic polymerization permits impact-modified polystyrene to be obtained with less than 50 ppm of monomeric styrene, in particular less than 10 ppm. Anionically polymerized impact-modified polystyrene generally comprises no cyclic oligomers.

Impact-modified polystyrenes with a relatively high content of particles with capsule particle morphology generally exhibit relatively high gloss. They may be blended with an anionically polymerized or free-radical-polymerized glass-clear or impact-modified polystyrene. To improve impact strength, they are preferably blended with anionically polymerized or free-radical-polymerized impact-modified polystyrene with cellular particle morphology.

Anionically polymerized, impact-modified polystyrene in which from 95 to 99 percent by volume of the disperse soft phase has capsule particle morphology and from 1 to 5 percent by volume has cellular particle morphology exhibits a property profile with a balance between gloss and impact strength.

These materials may be prepared directly by anionically polymerizing styrene in the presence of an anionic polymerization initiator and of a mixture of a styrene-butadiene two-block copolymer whose styrene block content is from 40 to 60% by weight, preferably from 45 to 55% by weight, and a styrene-butadiene-styrene three-block copolymer with a total styrene content of from 5 to 75% by weight, in particular from 25 to 50% by weight. It is also possible for the anionically polymerized, impact-modified polystyrene with cellular particle morphology to be mixed subsequently with the above-described styrene-butadiene-styrene three-block copolymer or with an impact-modified polystyrene with cellular particle morphology.

The styrene-butadiene block copolymers used have preferably been stopped with an alcohol or a phenol as chain terminator.

The residual butadiene content of the styrene-butadiene block copolymers used should be below 200 ppm, preferably below 50 ppm, in particular below 10 ppm.

The styrene-butadiene copolymer may be dissolved in styrene and, where appropriate, another solvent and used directly for the polymerization of styrene in the presence of the styrene-butadiene copolymer for preparing the impact-modified polystyrene.

The content of styrene-butadiene block copolymer, based on the impact-modified polystyrene, is advantageously from 5 to 25% by weight.

The conversion, based on styrene in the hard matrix, is generally above 90%, preferably above 99%. The process may in principle also be taken to complete conversion.

Instead of styrene, use may also be made of other vinylaromatic monomers for the polymerization of the hard matrix or of the styrene blocks in the block copolymers. Examples of others which are suitable are α-methylstyrene, p-methylstyrene, ethylstyrene, tert-butylstyrene, vinyltoluene, 1,2-diphenylethylene and 1,1-diphenylethylene, and mixtures. It is particularly preferable to use styrene.

Instead of butadiene, the rubbers may also contain other dienes, such as 1,3-pentadiene, 2,3-dimethylbutadiene, isoprene or mixtures of these.

The anionic polymerization initiators used are usually mono-, bi- or multifunctional alkyl, aryl or aralkyl compounds of alkali metals. It is advantageous to use organolithium compounds, such as ethyl-, propyl-, isopropyl-, n-butyl-, sec-butyl-, tert-butyl-, phenyl-, diphenylhexyl-, hexamethylenedi-, butadienyl-, isoprenyl-, or polystyryllithium, or the multifunctional compounds 1,4-dilithiobutane, 1,4-dilithio-2-butene or 1,4-dilithiobenzene. The amount needed of alkali metal organyl compound depends on the molecular weight desired, on the type and amount of the other metal organyl compounds used, and also on the polymerization temperature. It is generally from 0.002 to 5 mol percent, based on the total amount of monomer.

The polymerization may be carried out in the absence of or in the presence of a solvent. Solvents whose use is preferred are aromatic hydrocarbons or hydrocarbon mixtures, such as benzene, toluene, ethylbenzene, xylene or cumene. The use of toluene is particularly preferred.

The polymerization is preferably carried out at a solvent content below 40 percent by weight. The reaction rate here may be reduced by adding compounds which reduce the polymerization rate, known as retarders, as described in WO 98/07766. It is preferable for the retarder used to be magnesium organyl compounds, aluminum organyl compounds or zinc organyl compounds, alone or in mixtures.

Suitable magnesium organyl compounds are those of the formula $R_2Mg$, where the radicals R, independently of one another, are hydrogen, halogen, $C_1$–$C_{20}$-alkyl or $C_6$–$C_{20}$-aryl. It is preferable to use dialkylmagnesium compounds, in particular the commercially available ethyl, propyl, butyl, hexyl or octyl compounds. It is particularly preferable to use (n-butyl)(sec-butyl)magnesium, which is soluble in hydrocarbons.

The aluminum organyl compounds used may be those of the formula $R_3Al$, where the radicals R, independently of one another, are hydrogen, halogen, $C_1$–$C_{20}$-alkyl or $C_6$–$C_{20}$-aryl. Preferred aluminum organyl compounds are the trialkylaluminum compounds, such as triethylaluminum, triisobutylaluminum, tri-n-butylaluminum, triisopropylaluminum and tri-n-hexylaluminum. It is particularly preferable to use triisobutylaluminum. The aluminum organyl compounds used may also be those produced by partial or complete hydrolysis, alcoholysis, aminolysis or oxidation of alkyl- or arylaluminum compounds. Examples of these are diethylaluminum ethoxide, diisobutylaluminum ethoxide, diisobutyl(2,6-di-tert-butyl-4-methylphenoxy)aluminum (CAS No. 56252-56-3), methylaluminoxane, isobutylated methylaluminoxane, isobutylaluminoxane, tetraisobutyldialuminoxane and bis(diisobutyl)aluminum oxide.

The molar ratios of retarder to polymerization initiator may be varied within wide limits and depend mainly on the retarding effect desired, on the polymerization temperature, on the monomer composition and monomer concentration, and also on the molecular weight desired, and it is advantageous to select a molar ratio of retarder to polymerization initiator of from 0.2:1 to 10:1.

It is particularly preferable for the polymerization of the styrene to be carried out in the presence of a trialkylaluminum or dialkylmagnesium compound.

To increase the elongation at break, from 0.1 to 10% by weight, preferably from 0.5 to 5% by weight, of mineral oil, based on the impact-modified polystyrene, may be added in the process of the invention.

As described in WO 97/07766, the polymerization of the hard styrene matrix may be carried out batchwise or continuously, in stirred reactors, circulating reactors, tubular reactors, tower reactors or disc reactors. It is preferable for the polymerization to be carried out continuously in a reactor arrangement composed of at least one back-mixing reactor (e.g. stirred reactor) and of at least one non-back-mixing reactor (e.g. tower reactor).

After completion of the polymerization of the hard styrene matrix, it is preferable to carry out termination with a protic substance, for example alcohols, such as isopropanol, phenols, water or acids, such as aqueous carbon dioxide.

It can be advantageous to crosslink the rubber particles by controlling the temperature appropriately and/or by adding peroxides, in particular those with a high decomposition temperature, such as dicumyl peroxide. The peroxides are added here after completion of the polymerization and after any addition of a chain terminator, and prior to the devolatilization. However, it is preferable for the soft phase to be crosslinked thermally after the polymerization at from 200 to 300° C.

Other conventional auxiliaries, such as stabilizers, lubricants, flame retardants, antistats, etc., may be added to the polymers of the invention.

The impact-modified polystyrene of the invention is suitable for producing fibers, films or moldings.

EXAMPLES

Test Methods

Molar mass and molar mass distributions were determined by gel permeation chromatography (GPC) in tetrahydrofuran and using calibration by polystyrene or by polybutadiene to evaluate the resultant chromatograms.

The styrene content and the 1,2-vinyl content in the rubber were determined by evaluating data from $^1$H NMR spectroscopy.

The mechanical and physical tests on the impact-modified polystyrenes used compression-molded (DIN 16770—Part 1) or injection-molded (ISO 3167) test specimens. Yield stress and elongation at break were determined at 23° C. to DIN 53455. Hole notch impact strength was determined to DIN 53753 at 23° C. on compression-molded test specimens of dimensions 50 mm*6 mm*4 mm (hole diameter: 3 mm). Unless otherwise stated, the measurements were carried out on compression-molded test specimens.

Gloss measurements used a micro-TRI-gloss reflectometer from BYK-Gardner. The gloss values are reflectometer values determined to DIN 67530.

All of the monomers and solvents used were dried over aluminum oxide or molecular sieves.

Synthesis of Rubber Solutions

Example K1

(Butadiene-Styrene Two-Block Copolymer with Block Length Ratio 100/85) 13.8 kg of dry toluene were charged to a 50 l stirred reactor and mixed with 3024 g of butadiene, with stirring. The mixture is heated to 40° C. and mixed at this temperature with 126 ml of a 0.24 molar solution of sec-butyllithium in cyclohexane. The solution is heated to 44° C., and after 31 minutes 2873 g of styrene are added to the reaction mixture. After 53 minutes the reaction solution becomes orange, and the maximum internal temperature was 55.8° C. After a further 80 minutes 2.1 g of isopropanol were used to terminate the reaction solution at a solids content of 30.3% by weight, and the solids content was reduced to 16.2% by weight by adding 17.2 kg of styrene.

GPC analysis showed the block copolymer to have monomodal distribution. The B/S block lengths are 100/85 kg/mol. The residual butadiene content was below 10 ppm. $^1$H NMR gave the butadiene content of the block copolymer as 11.5% in the 1,2-vinyl form. The solution viscosity of a 5.43% strength solution of the block copolymer in toluene was 19.4 mPas.

Example K2
(Butadiene-styrene Two-block Copolymer with Block Length Ratio 130/105)

13.8 kg of dry toluene were charged to a 50 l stirred reactor and mixed with 3290 g of butadiene, with stirring. The mixture was heated to 40° C. and mixed at this temperature with 114 ml of a 0.24 molar solution of sec-butyllithium in cyclohexane. The solution was heated to 50° C., and after 83 minutes 2607 g of styrene were added to the reaction mixture. The maximum internal temperature was 54.6° C. After a further 77 minutes 1.7 g of isopropanol were used to terminate the reaction mixture at a solids content of 30.9% by weight, and the solids content was reduced to 16.0% by weight by adding 17.2 kg of styrene.

GPC analysis showed the resultant block copolymer to have monomodal distribution. The B/S block lengths were 130/105 kg/mol. The residual butadiene content was below 10 ppm. $^1$H NMR gave the butadiene content of the rubber as 11.2% in the 1,2-vinyl form. The solution viscosity of a 5.43% strength solution of the rubber in toluene was 26.3 mPas.

Example K3
(Butadiene-styrene Two-block Copolymer with Block Length Ratio 160/95)

13.8 kg of dry toluene were charged to a 50 l stirred reactor and mixed with 3570 g of butadiene, with stirring. The mixture was heated to 40° C. and mixed at this temperature with 101 ml of a 0.24 molar solution of sec-butyllithium in cyclohexane. The solution was heated to 42.3° C., and after 35 minutes 2328 g of styrene were added to the reaction mixture. After 28 minutes the reaction solution became orange, and the maximum internal temperature was 56.3° C. After a further 117 minutes 1.6 g of isopropanol were used to terminate the reaction mixture at a solids content of 30.5% by weight, and the solids content was reduced to 16.0% by weight by adding 17.2 kg of styrene.

GPC analysis showed the block copolymer to have monomodal distribution. The B/S block lengths were 160/95 kg/mol. The residual butadiene content was below 10 ppm. $^1$H NMR gave the butadiene content of the rubber as 11.6% in the 1,2-vinyl form. The solution viscosity of a 5.43% strength solution of the rubber in toluene was 55.9 mPas.

Example K4
(Butadiene-styrene Two-block Copolymer with Block Length Ratio 220/70)

13.8 kg of dry toluene were charged to a 50 l stirred reactor and mixed with 4474 g of butadiene, with stirring. The mixture was heated to 40° C. and mixed at this temperature with 75.3 ml of a 0.24 molar solution of sec-butyllithium in cyclohexane. The solution was heated to 45° C., and after 70 minutes 1424 g of styrene were added to the reaction mixture. After 20 minutes the reaction solution became orange, and the maximum internal temperature was 58° C. After a further 117 minutes 1.2 g of isopropanol were used to terminate the reaction mixture at a solids content of 30.2% by weight, and the solids content was reduced to 16.1% by weight by adding 17.2 kg of styrene.

GPC analysis showed the block copolymer to have monomodal distribution. The B/S block lengths were 220/70 kg/mol. The residual butadiene content was below 10 ppm. $^1$H NMR gave the butadiene content of the rubber as 12.0% in the 1,2-vinyl form. The solution viscosity of a 5.43% strength solution of the rubber in toluene was 64.2 mPas.

Example K5
(S-B-S Three-block Copolymer with Block Length Ratio 15/120/70)

13.8 kg of dry toluene were charged to a 50 l stirred reactor. The mixture was heated to 40° C. and mixed at this temperature with 119.9 ml of a 0.24 molar solution of sec-butyllithium in cyclohexane. The solution was mixed with 425 g of styrene, with stirring, and heated to 45° C. within a period of 60 min. A further 3450 g of butadiene were added within a period of 39 min at an internal temperature of 52.5° C. The mixture was stirred for a further 51 minutes at 52.5° C. 2022 g of styrene were then added. During this process, the temperature rose to 56° C. After 93 minutes, 2.2 ml of isopropanol were used to terminate the reaction mixture, and this was diluted with 17.2 kg of styrene from a solids content of 30% by weight to a solids content of 16.0% by weight.

GPC analysis showed the block copolymer to have monomodal distribution. The S-B-S block lengths were respectively 15,000/120,000/70,000 g/mol. The residual butadiene content was below 10 ppm. $^1$H-NMR gave the butadiene content of the rubber as 12% in the 1,2-vinyl form. The solution viscosity of a 5.43% strength solution of the rubber in toluene was 28.7 mPas.

Preparation of Impact-modified Polystyrene (HIPS)

Examples H1 to H8 were carried out continuously. They used a double-walled, 1.9 l stirred reactor with a standard anchor stirrer. The reactor was designed from a pressure of 25 bar and temperature-controlled by a heat-transfer medium for isothermal conduct of the polymerization. The polymerization solution from the stirred reactor was passed on to a stirred 4 liter tower reactor which had been provided with two heating zones of equal size. The discharge from the reactor was mixed with a 10% strength by weight solution of methanol in toluene, passed through a mixer and then through a tubular section heated to 240° C., and, with reduction of pressure via a pressure-regulator valve, into a vacuum vessel operated at 10 mbar. The melt was discharged using a screw, and pelletized.

Example H1

363 g/h of styrene, 653 g/h of the rubber solution from Example K1 and 15.4 g/h of a retarder solution (0.8 molar solution of (n-butyl)(s-butyl)magnesium diluted in heptane in a weight ratio of 1:4) were metered into the stirred reactor, with stirring (100 rpm), and stirred with the temperature of the materials constant at 90.2° C.

The solution was passed on into the tower reactor. The first heating zone was regulated to an internal temperature of 121.5° C., and the second to 157.9° C. The discharge from the reactor was mixed with 11 g/h of a 10% strength by weight solution of methanol in toluene, and passed through a mixer. Via the mixer, 2.5% by weight of mineral oil, based on the impact-modified polystyrene, was admixed with the polymer melt. The material was then passed through a tubular section heated to 240° C. and passed, with reduction of pressure via a pressure regulator valve, into a vacuum vessel operated at 10 mbar. The melt was discharged using a screw, and pelletized.

Steady running conditions became established after a short period. The solids content at the exit from the first reactor was 36.6% by weight. Quantitative conversion was found at the exit from the continuous system.

The polystyrene matrix had a molar mass Mw of 165,000 g/mol and a polydispersity Mw/Mn of 2.84. The distribution was monomodal. The content of styrene was determined as below 5 ppm, as was that of ethylbenzene.

Table 1 gives the results.

Example H2 to H8

Examples H2 to H8 were carried out in a manner similar to that for H1, in the same reactor arrangement, with the experimental parameters given in Table 1. At the exit from the entire reactor system the conversion found was in each case above 99%.

In all of the examples, the polystyrene matrix had monomodal distribution. In all of the examples the content of styrene was determined as below 5 ppm, as was that of ethylbenzene.

Examples H3 and H4 are comparative experiments.

After discharge from the tower reactor, in Example H5, the polymer melt was mixed with 24 g/h of a polymer melt from Example H4.

Prior to introduction into the tower reactor in Example H6, the polymer melt was mixed in a static mixer with the rubber solution from Example K4.

The results are given in Table 2.

TABLE 1

Experimental parameters for Examples H-1 to H8

| | | Example | | | | | | | |
|---|---|---|---|---|---|---|---|---|---|
| | | H1 | H2 | H3 | H4 | H5 | H6 | H7 | H8 |
| Stirred reactor | Styrene [g/h] | 363 | 341 | 380 | 361 | 363 | 369 | 369 | 369 |
| | Rubber solution [g/h] | K1/653 | K2/714 | K3/661 | K5/688 | K1/653 | K1/669 | K1/649 K5/20 | K1/649 K3/20 |
| | Retarder solution [g/h] | 15.4 | 15.1 | 12.8 | 14 | 15.4 | 15.4 | 15.5 | 15.5 |
| | Temp. of materials [° C.] | 90.2 | 90.5 | 93.1 | 93.6 | 90.2 | 92 | 93.5 | 94 |
| | Solids content [% by weight] at exit | 36.6 | 35.6 | 35.6 | 35.9 | 36.4 | 36.5 | 35.5 | 35.8 |
| | Rubber solution / [g/h] | | | | | | K4/66 | | |
| Tower | 1st zone [° C.] | 121.5 | 121 | 127 | 122 | 121.5 | 122 | 120 | 120 |
| | 2nd zone [° C.] | 157.9 | 161 | 159.5 | 158.6 | 157.9 | 160 | 160 | 160 |
| Discharge | Methanol solution (10% by weight) [g/h] | 11 | 13 | 11 | 11 | 11 | 11 | 11 | 11 |
| Mixer | Blending of melt with polymer solution from Example / [g/h] | | | | | H4/24 | | | |

TABLE 2

Properties of impact-modified polystyrenes from Examples H1 to H8

| | | Example | | | | | | | |
|---|---|---|---|---|---|---|---|---|---|
| | | H1 | H2 | H3 | H4 | H5 | H6 | H7 | H8 |
| Polystyrene matrix $M_w$ | [kg/mol] | 165 | 175 | 174 | 188 | 170.5 | 168 | 171 | 172 |
| $M_w M_n$ | | 2.84 | 2.95 | 2.86 | 2.98 | 3.08 | 3.08 | 2.92 | 2.95 |
| Yield stress | [N/mm$^2$] | 32.1 | 31.3 | 31.2 | 29.6 | 30.5 | 30.8 | 29.8 | 30.5 |
| Gloss* 60°/20° parallel to plate | | 91.1/ 62.3 | 91.8/ 63.2 | 87.5/ 40.7 | 74.8/ 28.0 | 90.1/ 61.3 | 89.7/ 59.8 | 88.1/ 60.3 | 89.5/ 60.7 |
| Elongation at break | [%] | 11 | 17 | 2.7 | 25.0 | 20.0 | 21.2 | 15 | 18 |
| Hole notch impact strength | [kJ/m$^2$] | 4.5 | 4.7 | 8.6 | 14.9 | 13.5 | 13.2 | 12.9 | 12.6 |
| Melt volume rate | [cm$^3$/10 min] | 7.6 | 5.1 | 4.8 | 4.6 | — | — | 6.2 | 6.4 |
| Vicat B/50 heat distortion temperature | [° C.] | 89.0 | 90.1 | 93.3 | 92 | 91.2 | 91.4 | 90.3 | 90.1 |
| Morphology | | Capsule | Capsule | Cells | Cells | Capsule + cells | Capsule + cells | Capsule + cells | Capsule + cells |

We claim:

1. An anionically polymerized, impact-modified polystyrene which comprises a disperse soft phase of which at least 90 percent by volume is composed of particles with capsule particle morphology.

2. An anionically polymerized, impact-modified polystyrene as claimed in claim 1, wherein 95 to 99 percent by volume of the disperse soft phase has capsule particle morphology and from 1 to 5 percent by volume of this phase has cellular particle morphology.

3. A mixture made from the anionically polymerized, impact-modified polystyrene as claimed in claim 1 and from an anionically polymerized or free-radical-polymerized, glass-clear or impact-modified polystyrene.

4. The process for preparing impact-modified polystyrene as claimed in claim 1, by anionically polymerizing styrene in the presence of a styrene-butadiene two-block copolymer and of an anionic polymerization initiator, which comprises using a styrene-butadiene two-block copolymer whose styrene block content is from 40 to 60% by weight.

5. The process for preparing impact-modified polystyrene, as claimed in claim 4, wherein the styrene block content of the styrene-butadiene two-block copolymer is from 45 to 55% by weight.

6. The process for preparing impact-modified polystyrene, as claimed in claim 4, wherein the styrene-butadiene two-block copolymer has a styrene block S with a weight-average molar mass $M_w$ of from 20,000 to 200,000 g/mol and has a butadiene block B with a weight-average molar mass $M_w$ of from 30,000 to 300,000 g/mol.

7. The process for preparing impact-modified polystyrene, as claimed in claim 4, wherein use is made of a styrene-butadiene two-block copolymer stopped with an alcohol or a phenol as chain terminator.

8. The process for preparing impact-modified polystyrene, as claimed in claim 4, wherein an organyl magnesium compound, organyl aluminum compound or organyl zinc compound is also present as retarder.

9. The process for preparing impact-modified polystyrene, as claimed in claim 4, wherein an aromatic hydrocarbon is used as solvent.

10. The process for preparing impact-modified polystyrene, as claimed in claim 4, wherein the polymerization is carried out at a solvent content below 40 percent by weight.

11. The process for preparing impact-modified polystyrene, as claimed in claim 4, wherein the polymerization is followed by thermal crosslinking of the soft phase at from 200 to 300° C.

12. The process for preparing impact-modified polystyrene, as claimed in claim 4, wherein the process is carried out continuously in a reactor arrangement composed of at least one back-mixing reactor and of at least one non-back-mixing reactor.

13. The process for preparing impact-modified polystyrene as claimed in claim 2, by anionically polymerizing styrene in the presence of an anionic polymerization initiator and of a mixture of a styrene-butadiene two-block copolymer whose styrene block content is from 40 to 60% by weight with a styrene-butadiene-styrene three-block copolymer whose total styrene content is from 5 to 75 percent by weight.

14. The process for preparing impact-modified polystyrene wherein 95 to 99 percent by volume of the disperse soft phase has capsule particle morphology and from 1 to 5 percent by volume of this phase has cellular particle morphology, by mixing an impact-modified polystyrene as claimed in claim 1 of which from more than 95 to 100 percent by volume has capsule particle morphology and an impact-modified polystyrene with cellular particle morphology.

15. A method of using the impact-modified polystyrene or mixtures as claimed in claim 1, comprising producing fibers, films or moldings.

16. A fiber, a film or a molding, produced from impact-modified polystyrene as claimed in claim 1.

* * * * *